United States Patent [19]

Voorhees

[11] Patent Number: 5,359,931
[45] Date of Patent: Nov. 1, 1994

[54] HIGHLIGHTING FOR PHOTOCOPIERS AND FACSIMILE MACHINES

[76] Inventor: Scott W. Voorhees, 1308 Devil's Reach Rd, Ste. 302, Woodbridge, Va. 22912

[21] Appl. No.: 753,904

[22] Filed: Sep. 3, 1991

Related U.S. Application Data

[62] Division of Ser. No. 321,732, Mar. 10, 1989, Pat. No. 5,098,817.

[51] Int. Cl.⁵ .............................................. B41F 13/10
[52] U.S. Cl. .................................... 101/375; 101/328
[58] Field of Search ................. 101/375, 328–331, 101/405, 406

[56] References Cited

U.S. PATENT DOCUMENTS

| | | | |
|---|---|---|---|
| 283,583 | 8/1883 | Dorr | 101/330 |
| 637,832 | 11/1899 | Rosenberg | 401/208 |
| 642,367 | 1/1900 | Ray et al. | 101/329 |
| 1,163,988 | 12/1915 | Epple | 101/329 |
| 2,204,577 | 6/1940 | Davis et al. | 101/375 |
| 2,693,146 | 5/1952 | Mason et al. | 101/375 |
| 3,152,528 | 10/1964 | Pendry | 95/1.7 |
| 3,402,663 | 9/1968 | Funahashi | 101/327 |
| 3,465,673 | 9/1969 | Oppenheim | 101/328 |
| 3,646,885 | 3/1972 | Kolody | 101/328 |
| 3,942,621 | 3/1976 | Karlan | 197/181 |
| 4,045,219 | 8/1977 | Bean | 96/1.2 |
| 4,070,109 | 1/1978 | Ihlenfeld et al. | 355/77 |
| 4,118,122 | 10/1987 | Rees et al. | 355/77 |
| 4,172,419 | 10/1979 | Munyon | 101/405 |
| 4,492,162 | 1/1985 | Nettesheim et al. | 101/405 |
| 4,609,585 | 9/1986 | Seijo | 428/194 |
| 4,632,529 | 12/1986 | Levin | 353/122 |
| 4,667,254 | 5/1987 | Araki et al. | 358/293 |
| 4,670,794 | 6/1987 | Araki et al. | 358/293 |
| 4,777,510 | 10/1988 | Russel | 355/7 |
| 4,862,217 | 8/1989 | Russel | 355/218 |

FOREIGN PATENT DOCUMENTS

| | | | |
|---|---|---|---|
| 2372701 | 8/1978 | France | 101/329 |
| 1196169 | 6/1970 | United Kingdom | 101/328 |

Primary Examiner—Edgar S. Burr
Assistant Examiner—Anthony H. Nguyen
Attorney, Agent, or Firm—Nixon & Vanderhye

[57] ABSTRACT

Text (indicia, words, symbols, etc.) of documents is highlighted in such a way that it will reproduce when electronically copied (e.g. photocopied or telecopied). This is accomplished by applying a tone to only that area of the document to be highlighted and so that the tone remains in place during copying. The tone is sufficiently dark so as to highlight the text, but light enough so that the text is readable. The tone may be a dot or line screened tone having about 30–65 lines per inch with a density of about 10–22%. The tone may be applied on adhesive tape and just placed over the document portions to be highlighted. The tape may be dispensed from a dispenser. Alternatively, the tone may be on a transfer sheet, and is transferred to the document merely by the act of rubbing on the transfer sheet. The tone may also be applied to the document utilizing a print wheel-in a casing, that is moved over the document. After the document is electronically copied (e.g. by a photocopier or a facsimile machine, for example) the document is highlighted yet the text is clearly legible.

6 Claims, 4 Drawing Sheets

HIGHLIGHTING FOR PHOTOCOPIERS AND FACSIMILE MACHINES This is a division of application Ser. No. 07/321,732, filed Mar. 10, 1989, now U.S. Pat. No. 5,098,817.

BACKGROUND AND SUMMARY OF THE INVENTION

A standard felt-tipped fluorescent highlighter is commonly used to accentuate text or other printed images in letters, reports, books, etc. In its brightly colored, semi-translucent state it is effective in drawing one's attention to a particular area of a page. However, this translucency also limits a highlighters' usefulness as it cannot be 'seen' by the optics of a photocopier and thereby cannot be consistently reproduced. In addition, facsimile technology cannot distinguish standard highlighter markings and thus cannot transmit the highlighted background.

According to the present invention, a method, product, and apparatus are provided for effecting highlighting of text, symbols, or the like in documents so that the highlighting reproduces when the document is reproduced electronically (e.g. by photocopying or by facsimile transmission), while not adversely the text after it has been reproduced. This is effectively provided for according to the present invention—in general—by providing a background tone to the text to be highlighted. A background "tone" is typically produced by screening utilizing either a dot screen or a line screen. It is most desirable according to the invention to utilize a tone produced from a dot screen where the dots are small enough and close enough in proximity to one another to appear as a continuous gray tone. The tone is of sufficient density to effectively highlight the text, but does not impair the legibility of the underlined text/symbols. It is most desirable to provide a tone of about 10–22% density (e.g. approximately 20% density), with about 30–65 lines per inch. Such a tone will adequately highlight the text on documents, while being reproduceable utilizing a photocopier or a facsimile transmission, without the highlighted information being obscured.

According to one aspect of the present invention there is provided a method of marking documents so as to highlight word and/or symbol areas thereof in such a way that the highlighting is reproduced when the document is electronically copied. The method comprises the steps of: (a) Applying a tone to only that area of the document to be copied so that the tone remains in place during copying, the tone having sufficient characteristics so that it clearly highlights the portions of the document to which it is applied while the words or symbols to which it is applied are clearly legible. And, (b) electronically copying the document so that the areas to which the tone was applied are highlighted on the copy, yet the words and/or symbols associated therewith are clearly legible. Step (b) may be preferably practiced by photocopying or by facsimile transmission. Step (a) may be practiced in a number of different ways.

One way of practicing step (a) is to provide the tone on a piece of adhesive tape, and applying the tape to the area to be highlighted. The tape may be a roll in a dispenser and the applying step is practiced by dispensing the tape from the dispenser onto the document. The tape may be perforated at predetermined spaced points along its length in the roll, and after the necessary length is determined the tape may be separated at the closest perforation to the desired length.

Alternatively, the applying step may be practiced by applying ink directly to the document to be highlighted, such as by utilizing an ink applicator roller which has the tone pattern thereon and is mounted in a housing for rotation about a horizontal axis. The ink applicator roller has another roller that it is in contact with, which in turn is in contact with a supply of ink so that ink is supplied to the applicator roller.

In yet another alternative, the tone may be provided on a transfer sheet and the transfer sheet may be applied over the document to be highlighted. By rubbing on the transfer sheet at the area of the transfer, it is-applied to the document. The transfer sheet preferably has a plurality of quadrate spaced rows and columns of tone at least some of which have a height dimension about the height of a line of type in the document.

According to another aspect of the present invention there is provided a tape for highlighting a document. The tape comprises an elongated substrate of transparent material with adhesive on one face thereof and a tone applied thereto. The width of the tape is preferably one-sixth of an inch, or an even (i.e. integer) multiple of about one-sixth of an inch so that it will cover one or more lines of type (standard type being about one-sixth inch in height).

According to yet another aspect of the present invention there is provided an adhesive tape dispenser, such as for dispensing the highlighting tape described above. The dispenser comprises the following elements: (a) An elongated housing. (b) Means for mounting a roll of adhesive tape in the housing about an axis generally perpendicular to the dimension of elongation of the housing. (c) Means defining a tape dispensing opening in the housing remote from the means (b). (d) Means defining a tape guide inside the housing from the means (b) to (c). (e) Roller means for advancing tape from the means (b) to the means (c) along the means (d), the roller means including a driving roller. (f) Means for effecting rotation of the driving roller. (g) Tape severing means adjacent the means (c). And, (h), means for effecting operation of the means (g).

It is the primary object of the present invention to provide a method, and devices, for effecting highlighting of documents so that the highlighted portions will reproduce when the document is electronically copied, but will not obscure the portions they highlight. This and other objects of the invention will become clear from an inspection of the detailed description of the invention and from the appended claims.

DETAILED DESCRIPTION OF THE DRAWINGS

Figure 1:
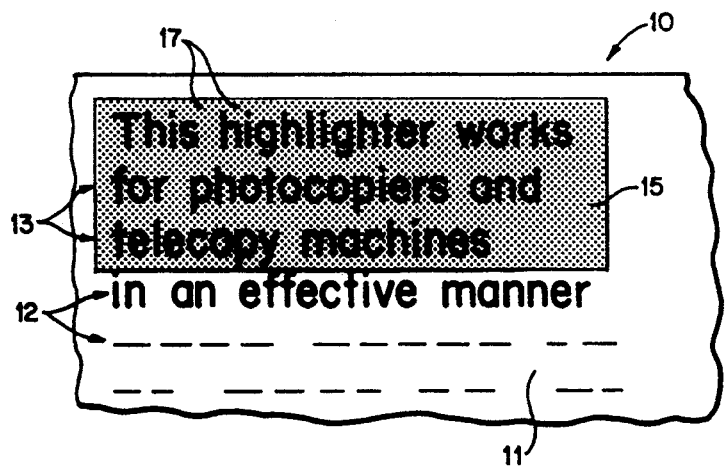
FIG. 1 illustrates a portion of a document, which includes highlighting according to the present invention.

FIG. 1 illustrates a highlighted document 10, such as is produced according to the method of the present invention. The document comprises a substrate 11, preferably of paper, with words, symbols, or other indicia 12, 13. The indicia 12 is not highlighted, but the indicia 13 is highlighted according to the present invention. This is accomplished by applying a tone 15 over the indicia 13. The tone may be formed utilizing a dot screen, line screen, or the like. For example it may be formed utilizing the dots 17 which are black and spaced from each other so that they clearly highlight the indicia 13, but are far enough apart so that the underlying indicia 13 is readable. The tone is preferably formed from screens with about 30–65 lines per inch and with a density of about 10–22% (e.g. about 20%). While it is preferred that the tone be screened on, it may be printed in other conventional manners too.

One way that the tone may be applied is by adhesive tape 15. The adhesive tape 15 comprises an elongated transparent substrate 19 (e.g. plastic) with the tone dots 17 or the like screened thereon. At predetermined places along the length of the substrate 19 are perforations 21, extending transversely to the dimension of elongation of the substrate 19 (and to the tape edge). An adhesive 22 is applied to one face of the tape 15, and preferably the tape is in the form of a roll 23. The adhesive may be of any conventional type, and may be a permanent adhesive such as is present on conventional pressure sensitive transparent tape, or it may be a readily releasable adhesive so that the tape 15 may be removed after it is applied (e.g. of the type utilized in the 3M "Post It Note" ® products).

If a roll of tape 23 is utilized, preferably it is applied to the areas to be highlighted by tape dispenser 24. If the tape dispenser 24 is utilized perforations 21 are not necessary to effect separation of portions of tape.

The tape dispenser 24 preferably comprises a housing 25 which includes means for mounting the tape roll 23 therein, which means may either be a portion of the housing 25 shaped to mount the roll, or a post for receiving the tape roll 23. The housing 25 is elongated in a dimension of elongation illustrated by arrows A in FIG. 3, and the roll 23 is mounted for rotation about an axis generally perpendicular to the dimension A. The housing 25 may have a trigger 26 mounted therein, for pivotal movement about a pivot pin 27 mounted to the portion 28 of the housing 25 opposite that portion of the roll 23 from which the tape 15 is dispensed. Opposite from the roll 23 in the dimension of elongation A is means defining a tape dispensing opening 29 through which the tape 15 is dispensed.

Connected to the trigger 26 there preferably is a rack 30 which has teeth 31 which engages a pinion 32 connected to a roller 33, the roller 33 comprising a driving roller rotatable about an axis parallel to the axis B. The roller 33 preferably cooperates with a stationary axis driven roller 35 mounted above the tape 15. Means are provided for defining a guide for the movement of the tape 15 from the roll 23 to the tape dispensing opening 29, for example the channel forming members 36, 37. Preferably the inner surfaces of the members 36, 37, and the outer surface of roller 33, are of low friction material (e.g. polytetrafluoroethylene) so that the tape 15 will not stick thereto. The roller 35 is of a frictional rubber material, or the like.

The dispenser 24 also preferably comprises means for severing the tape (if perforated tape is not used). Such means preferably comprises the trigger 39 rotatable about pivot pin 40, with a movable blade 41 mounted thereto and cooperating with a stationary blade 42. The relative movement between the blades 41, 42 caused by depressing the trigger 39 severs the tape 15. Guidance of the tape out of the tape dispensing opening 29 is preferably provided by idler roller 44.

Figure 3:
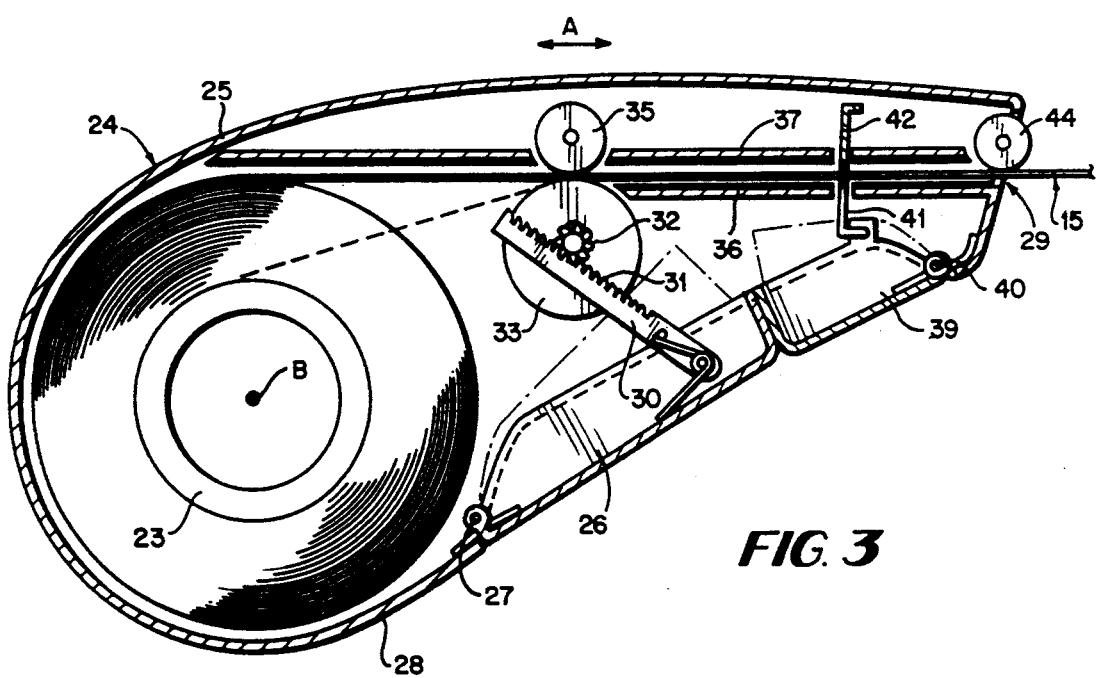
FIG. 3 is a side longitudinal cross-sectional view, partly in elevation, showing an exemplary tape dispenser for dispensing tape of FIG. 2.

Preferably the tape roll 23 may be inserted into the dispenser 24, and a used roll removed therefrom, merely by removing an entire side of the housing 25. When the side is removed the housing 25 and internal components appear as illustrated in FIG. 3.

The tape dispenser may take a variety of other forms too. Another exemplary form of tape dispenser is illustrated generally by reference numeral 124 in FIG. 5. The dispenser of FIG. 5 is like that of FIGS. 3 and 4 except for the mechanism for effecting rotation of the drive wheel. Components of the FIG. 5 embodiment that are identical or similar in function to those of the FIGS. 3 and 4 embodiment are illustrated by the same reference numeral only preceded by a "1".

In FIG. 5, the rack 130 with gear teeth 131 thereon is moved by arcuately moving the actuator 126. The teeth 131 engage pinion 132 on driving roller 133, which cooperates with upper pinch roller 135 to effect driving of the tape 15 within the dispenser. The cutting mechanism is actuated by trigger 139.

Figure 6:
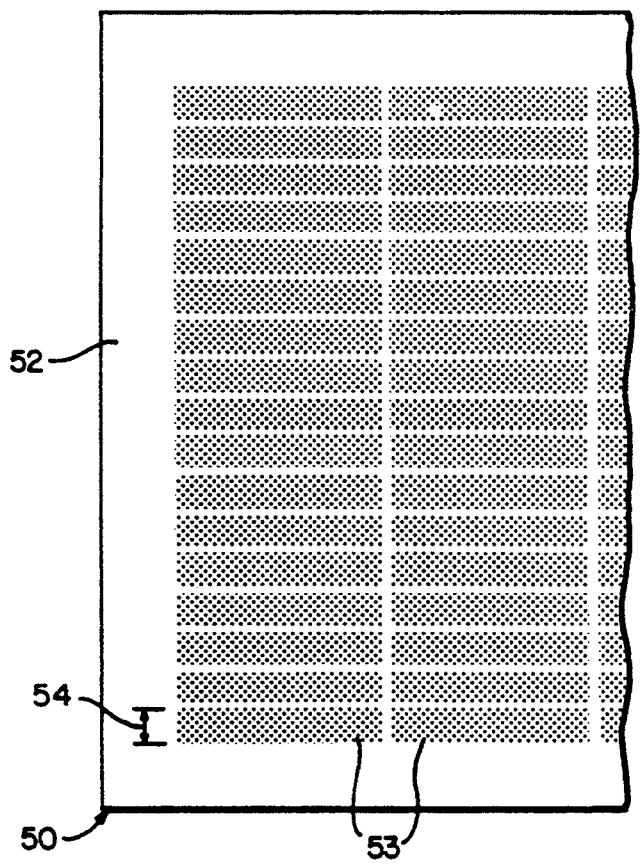
FIGS. 6 and 7 are plan views of portions of exemplary transfer sheets with tones thereon, for applying highlighting as according to the invention.

Another manner in which the tone may be applied is illustrated by the transfer sheet 50 in FIG. 6. The transfer sheet 50 comprises a substrate 52 of conventional transfer sheet material, which will receive ink thereon but then release the ink when it is rubbed. A number of spaced tone areas 53 are disposed on the substrate 52, e.g. screened thereon as by using a dot screen having between about 30–65 lines per inch and a density of between about 10–22%.. As seen in FIG. 6 the tone areas 53 are quadrate (e.g. rectangular), and preferably they have a height 54 corresponding to the average height of a line of type (e.g. about one-sixth inch). Simply by rubbing on the surface of the substrate 52 opposite that to which the ink has been screened, the tone pattern 53 will transfer onto an underlying document, covering one line of type at a time.

Figure 7:
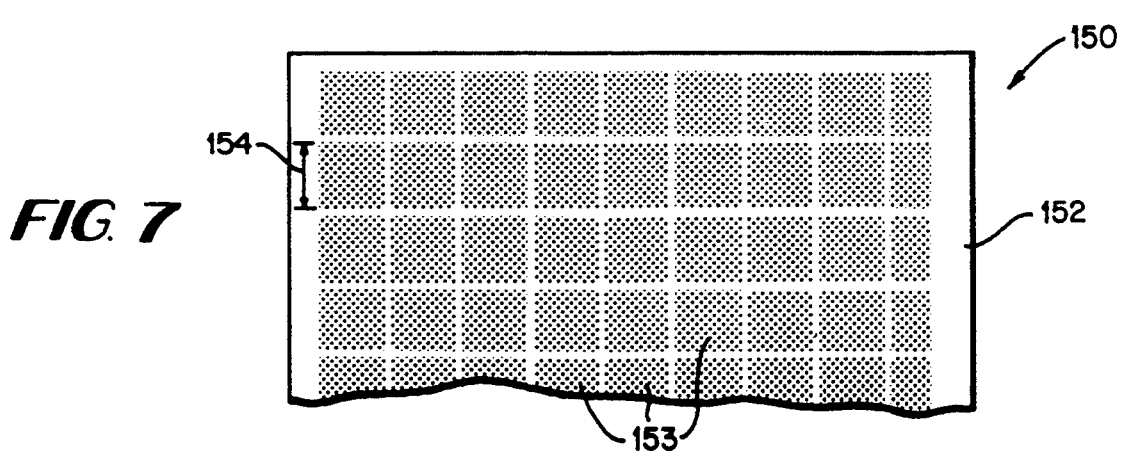

FIG. 7 illustrates a transfer sheet much like that in FIG. 6 except for the arrangement of the tone patterns. Like components in the FIG. 7 embodiment to those in the FIG. 6 embodiment are illustrated by the same reference numeral only preceded by a "1".

The transfer sheet 150 includes a substrate 152 with the quadrate tone areas 153 thereon. In this case the quadrate tone areas 153 are square in shape, and have a height 154 about the height of two lines of type (e.g. 1/3 inch).

Figure 8:
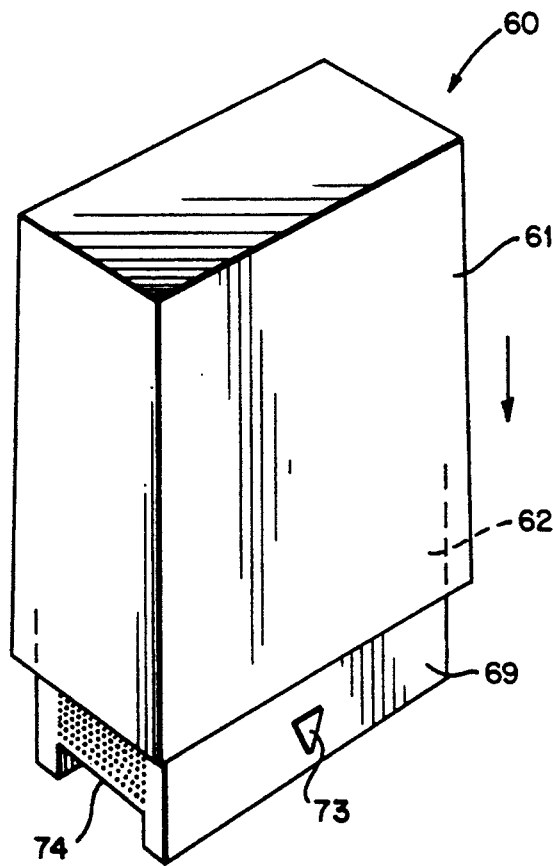
FIG. 8 is a top perspective view of an exemplary tone highlighting device according to the invention for applying ink directly onto document portions to be highlighted.
Figure 9:
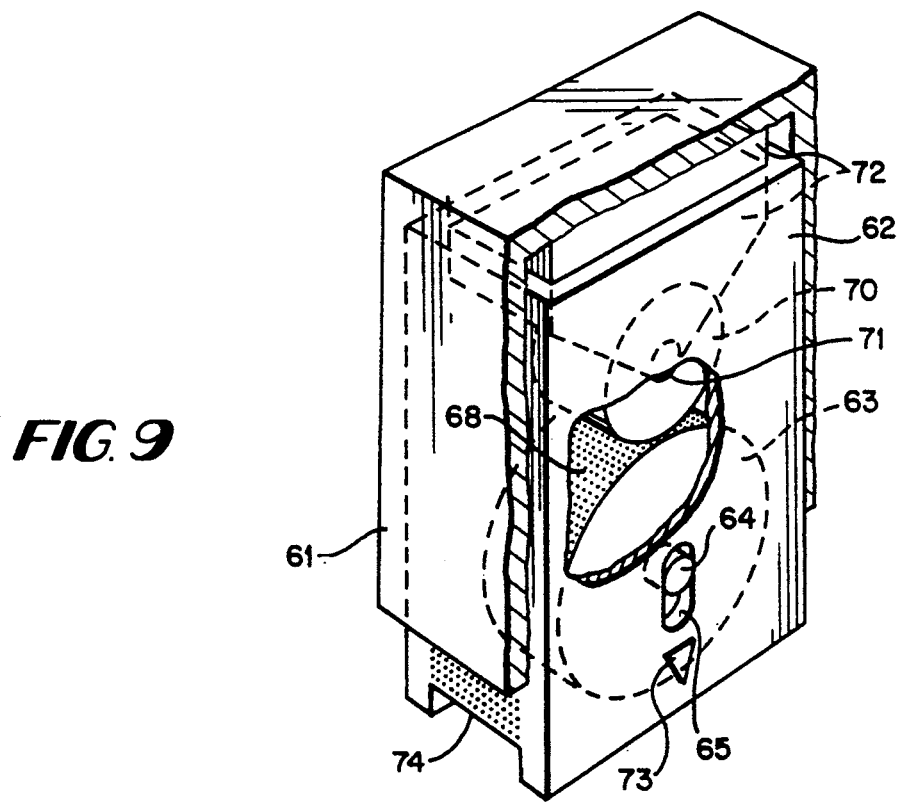
FIG. 9 is a view like that of FIG. 8 only with a portion of the casing cut away to illustrate the internal components for applying the highlighted tone.

Yet another way that the tone can be applied to highlight indicia on a document, according to the invention, is illustrated by the ink applicator 60 in FIGS. 8 and 9.

The applicator 60 comprises an outer housing 61 and an inner housing 62, which are relatively movable with respect to each other. A rolling drum print wheel 63 is mounted for pivotal movement about a horizontal axis by a shaft which is guided by and reciprocal within elongated slot 65 formed in inner housing 62. The shaft 64 is affixed to the interior of the outer housing 61. The print wheel 63 has a plurality of projections 68 extending radially outwardly therefrom which, when they are contacted with ink, will transfer the ink onto a substrate that they contact during rolling action of the roller 63. A bottom portion of the inner housing 62 extends outwardly from the outer housing 61 at the bottom, and has an arrow indicia 73 formed thereon to indicate the ink application area of the roller 63, with the cut out end surfaces 74 on the inner housing 62 defining the band that will be highlighted by the roller 63. Preferably the width of the roller 63 is an integer multiple of the height of a line of type (e.g. a multiple of one-sixth inch).

Ink may be applied to the print wheel 63 utilizing the drum wheel 70 rotatable about axis and supplied by ink from a felt pad (not shown) mounted within housing 72. Ink from the felt pad transfers to the drum wheel 70 and then onto the "dot" projection 68 to ultimately be applied to the document substrate.

Operation

Figure 2:
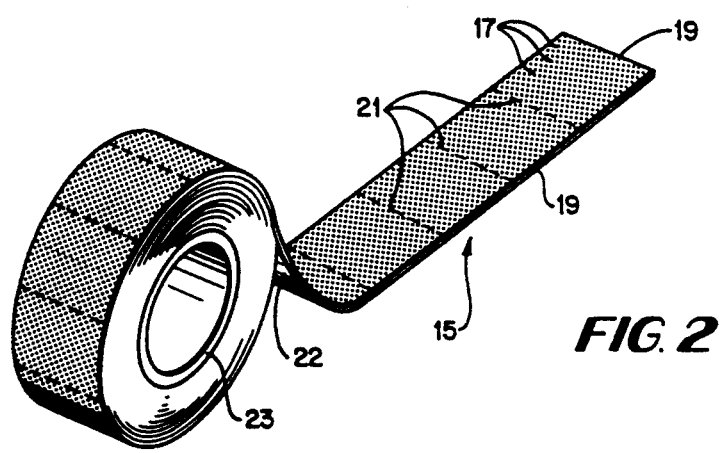
FIG. 2 is a roll of adhesive tape which includes a highlighting tone thereon, such as may be utilized to highlight a document as shown in FIG. 1.

For the embodiment illustrated in FIG. 2, the length of the area to be highlighted is determined, and then the tape 15 is separated at the appropriate perforation 21 closest to that length. The tape is then applied directly over the indicia 13 (as seen in FIG. 1) to highlight the indicia 13, while the indicia 13 is still readable. The document 10 is then electronically copied, as by a photocopier or transmission by facsimile machine, the highlighting 15, 17 also appearing on the electronically copied document while allowing the words and/or symbols comprising the indicia 13 to be clearly legible on such a copy. If adhesive 22 on the tape 15 is a releasable adhesive, then the tape 15 is removed from the original after copying.

Figure 4:
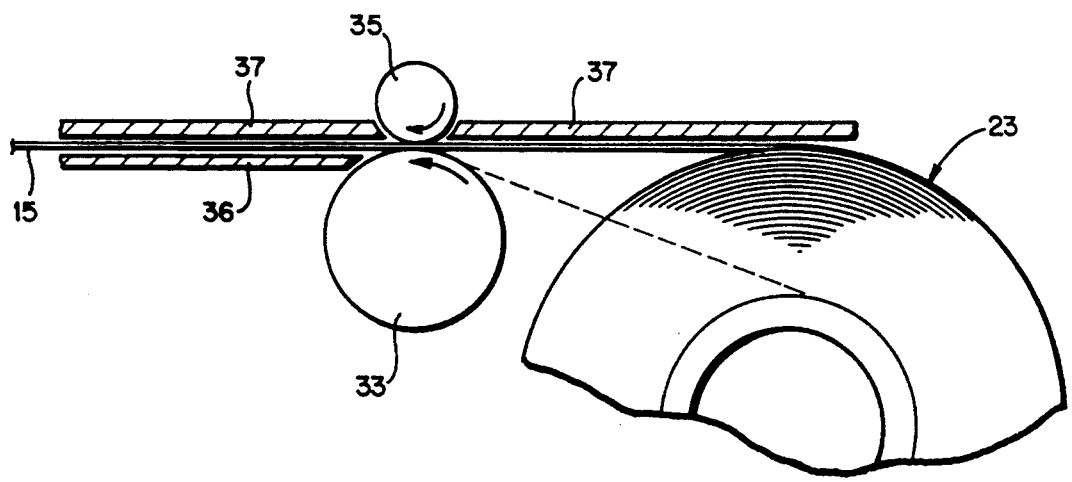
FIG. 4 is a detail view showing the tape driving and guiding components of the dispenser illustrated in FIG. 3.
Figure 5:
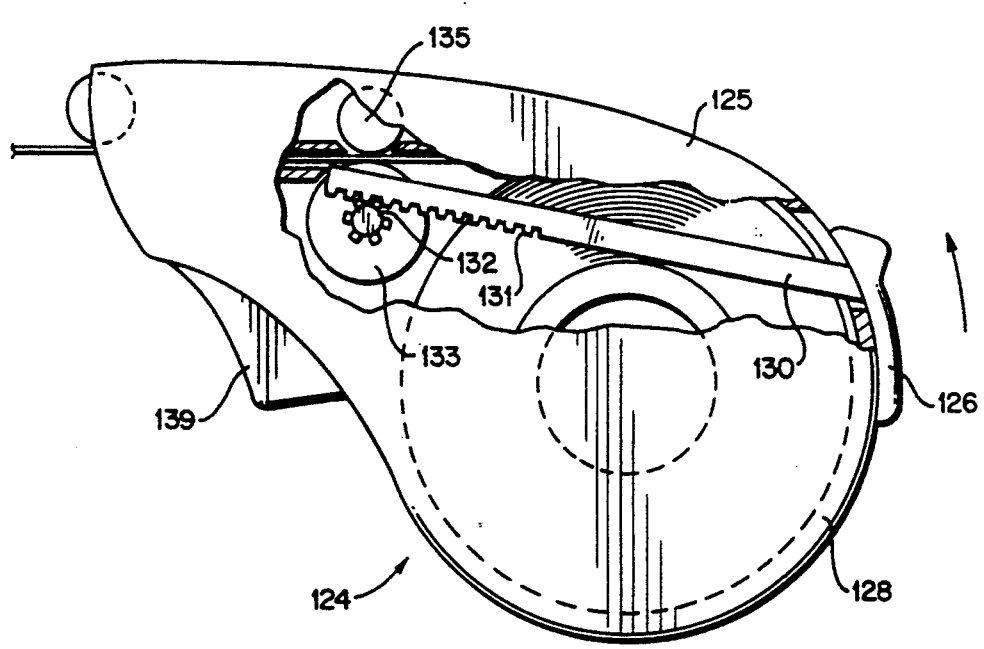
FIG. 5 is a side view, with portions cut away for clarity of illustration, of another exemplary tape dispenser according to the invention.

Utilizing the embodiment illustrated in FIGS. 3 and 4, the trigger 26 is depressed which causes the gear teeth to rotate the gear 32, in turn driving the tape 15 from the roll 23 to the opening 29 by interaction between rollers 33, 35, the tape moving along the smooth surfaces of the guide channel 36, 37. During dispersing of the tape, the roller 44 is used to impress the tape 15 onto the document. Once the desired length of tape has been dispensed from the opening 29, the trigger 39 is actuated causing the blades 41, 42 to move toward each other, severing the tape 15. For the embodiment illustrated in FIG. 5, the operation is the same except that the actuator 126 is moved to advance the tape, the trigger 139 causing operation of the severing blades.

With the embodiments illustrated in FIGS. 6 and 7, one merely places the transfer sheet 52, 152 over the desired area to be highlighted, ink side down, and the areas 53, 153 are rubbed with a rubbing instrument to transfer the tone pattern of ink from the substrate 52, 152 to the document.

For the embodiment illustrated in FIGS. 8 and 9, during use the base 69 is placed over the line or lines to be highlighted. Then the upper housing 61 is moved downwardly which moves the print wheel 63 into contact with the document. The entire structure 60 is then moved horizontally parallel to the line or lines of text to be highlighted, causing the projections 68 to engage the document in a rolling action and to transfer ink to the document. Ink is supplied to the projections 68 by the roller 70, which in turn is provided ink by a felt pad in the structure 72. The area to which the ink will be applied is gauged by viewing the indicia 73 and the cut out portions 74.

It will thus be seen that according to the present invention an effective method and apparatus have been provided for highlighting of documents in such a way that the highlighting will reproduce when the document is electronically copied (e.g. by a photocopier or facsimile). While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. An applicator for applying a tone pattern of dots or lines to a surface, comprising:
    an applicator roller having a peripheral, circumferential surface with a tone pattern of dots or lines thereon having a density of about 10–22%;
    a housing;
    means for mounting said applicator roller in said housing for rotation about an axis, a portion of the circumferential periphery of the roller, having the tone pattern thereon, extending outwardly from said housing; and
    means mounted within said housing for applying ink to the applicator tone pattern so that as said roller rolls on a surface to be marked with ink a marking in the form of said tone pattern of a density of about 10–22% is applied thereto.

2. Apparatus as recited in claim 1 wherein said means mounted within said housing for applying ink to said applicator roller includes a drum rotatable about an axis parallel to the axis of rotation of said applicator roller.

3. Apparatus as recited in claim 1 wherein said housing comprises a two part housing, one part slideable in a dimension perpendicular to the axis of rotation of said applicator roller.

4. Apparatus as recited in claim 1 wherein said means for mounting said roller for rotation about a horizontal axis comprises a shaft which is received within said housing.

5. Apparatus as recited in claim 4 wherein said housing includes an elongated slot, closed at both ends, which receives said shaft.

6. Apparatus as recited in claim 3 wherein said means for mounting said applicator roll comprises a shaft; and wherein said housing includes an elongated slot, closed at both ends, which receives said shaft, to allow slideable movement of one part of the housing with respect to the other.

* * * * *